United States Patent [19]

Barlow et al.

[11] Patent Number: 4,717,234

[45] Date of Patent: Jan. 5, 1988

[54] IN-LINE OPTICAL ATTENUATORS

[75] Inventors: Robert W. Barlow, Canton; Barry J. Opdahl, Williamsport, both of Pa.

[73] Assignee: GTE Products Corporation, Stamford, Conn.

[21] Appl. No.: 842,081

[22] Filed: Mar. 20, 1986

[51] Int. Cl.[4] .......... G02B 6/38

[52] U.S. Cl. .......... 350/96.21; 350/96.15

[58] Field of Search .......... 350/96.15, 96.20, 96.21, 350/96.22

[56] References Cited

U.S. PATENT DOCUMENTS

| | | | |
|---|---|---|---|
| 4,255,016 | 3/1981 | Borsuk | 350/96.21 |
| 4,257,671 | 3/1981 | Barbaudy et al. | 350/96.15 |
| 4,261,640 | 4/1981 | Stankos et al. | 350/96.15 |
| 4,674,831 | 6/1987 | Bagby | 350/96.20 |

FOREIGN PATENT DOCUMENTS

| | | | |
|---|---|---|---|
| 111905 | 8/1980 | Japan | 350/96.20 |
| 155304 | 12/1980 | Japan | 350/96.20 |

*Primary Examiner*—William L. Sikes
*Assistant Examiner*—Frank González
*Attorney, Agent, or Firm*—William H. McNeill

[57] ABSTRACT

An in-line attenuator for optical fibers includes an attenuator holder mounted within a housing. The attenuator is mounted in the housing by means permitting the attenuator a degree of movement along the longitudinal axis of the housing to make the attenuator automatically positionable when fibers are mated to the housing.

2 Claims, 3 Drawing Figures

IN-LINE OPTICAL ATTENUATORS

TECHNICAL FIELD

This invention relates to optical attenuators and more particularly to such attenuators for use with optical fibers. Still more particularly, it relates to in-line attenuators that can be employed with standard fiber optic connectors.

BACKGROUND ART

Many fiber optic communication systems require some method of reducing optical power at the receiving station, so as to avoid overloading of the detectors. Such power reduction may be accomplished by introducing into the system a device designed to dissipate or attenuate a controlled fraction of the input power while allowing the balance to continue through the system. Such attenuators are presently available in various configurations which employ various methods to control power loss.

Such in-line attenuators are shown, e.g., in U.S. Pat. Nos. 4,257,671 and 4,261,640. These devices require costly and complicated uniquely fabricated housings.

DISCLOSURE OF THE INVENTION

It is, therefore, an object of this invention to obviate the disadvantages of the prior art.

It is another object of the invention to enhance in-line optical attenuators.

It is still another object of the invention to provide an in-line attenuator that is automatically positionable with respect to is associated fibers.

It is yet another object of the invention to incorporate optical attenuators into standardized fiber optic connectors.

These objects are accomplished, in one aspect of the invention, by the provision of an in-line attenuator for optical fibers which comprises a housing having a longitudinal axis and a longitudinal aperture aligned therewith. The aperture includes first and second ends for receiving first and second axially aligned optical fibers. An attenuator holder is positioned in the aperture, the holder being tubular and having a longitudinal slit running the entire length thereof. A pair of attenuator receiving windows is formed in said holder, transverse to the longitudinal axis and oppositely disposed from one another. The windows have a given height and a given width. An optical attenuator having first and second ends is disposed in the holder, the first end of the attenuator engaging one of the windows and the second end of the attenuator engaging the other of the windows. The body of the attenuator intermediate the ends thereof being disposed across the longitudinal axis and having a height substantially equal to the given height and a thickness substantially less than the given width.

This attenuator is easily adaptable to standardized fiber optic connectors, thus eliminating specialized units. Further, because the thickness of the attenuator is less than the width of the window, the attenuator is permitted a degree of movement along the longitudinal axis equal to the width of the window. This allows the attenuator to be automatically positionable with respect to its associated fibers and insures contact of the fibers with the surfaces of the attenuator.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
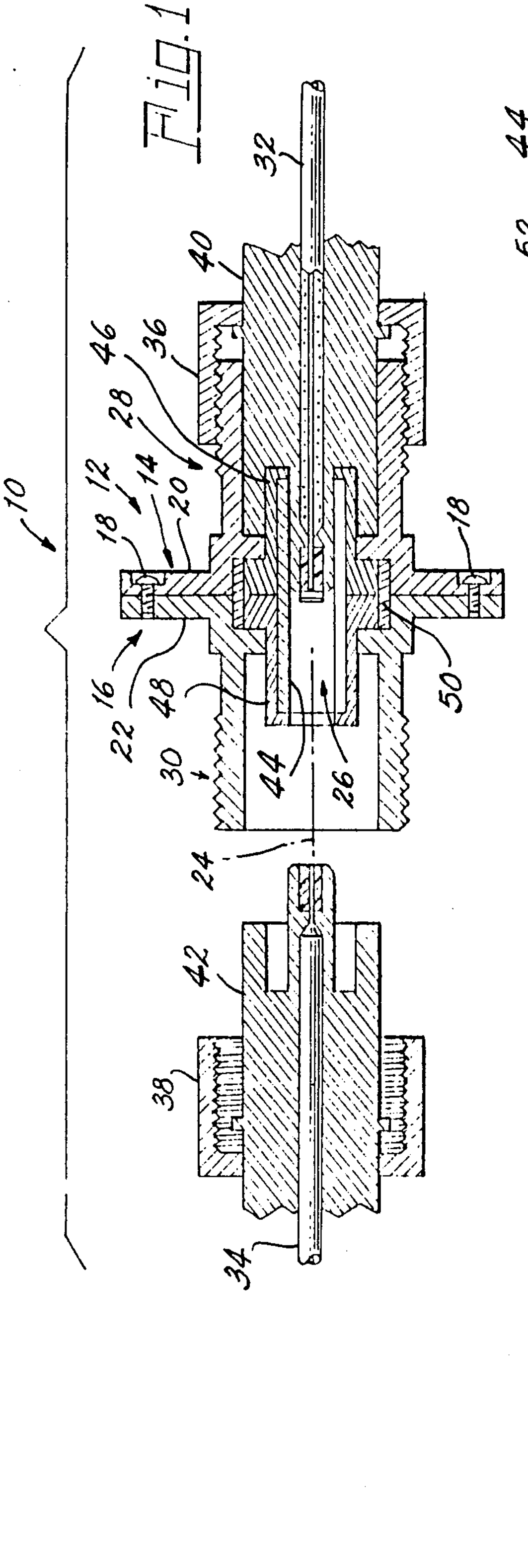
FIG. 1 is an exploded, elevational sectional view of an embodiment of the invention.

Referring now to the drawings with greater particularity, there is shown in FIG. 1 an in-line optical attenuator 10 comprised of a housing 12 formed, in this instance, of two mated halves 14 and 16 which can be joined by bolts 18 connecting mated flanges 20 and 22, respectively.

Housing 12 has a longitudinal axis 24 and a longitudinal aperture 26 aligned therewith. Additionally, the housing 12 has a first end 28 and a second end 30 for receiving a first optical fiber 32 and a second optical fiber 34 in axial alignment with axis 24. The external portions of first and second ends 28 and 30 can be threaded to receive nuts 36 and 38 which mount the precision ferrules 40 and 42 which carry the optical fibers.

Figure 3:
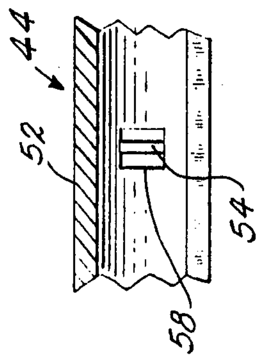
FIG. 3 is an enlarged sectional view of the central portion of the holder of FIG. 2.
Figure 2:
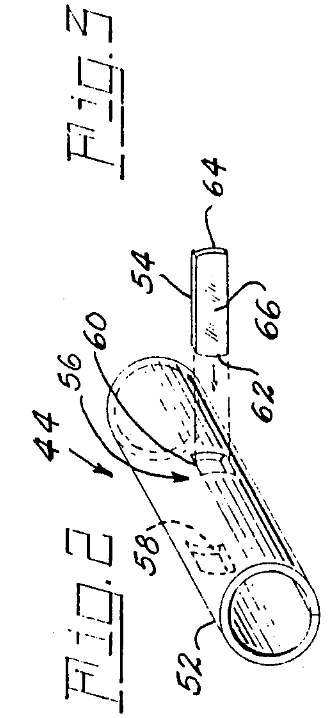
FIG. 2 is an axiometric view of one form of attenuator holder.

An attenuator holder 44, in the form of a split tubular sleeve 52 (see also, FIGS. 2 or 3) is positioned in longitudinal aperture 26 and held in place by bushings 46, 48 and bushing ring 50.

An attenuator 54 is mounted in holder 44, transverse to the longitudinal axis thereof, by means 56 which permits attenuator 54 a degree of movement along the longitudinal axis.

In the illustrated embodiment the means 56 comprises a pair of attenuator receiving windows 58 and 60 formed in holder 44, transverse to the longitudinal axis and oppositely disposed from one another. The windows have a given height and a given width (the width being measured along the longitudinal axis and the height normal thereto).

The attenuator 54 is substantially rectangular and has a first end 62, a second end 64 and an intermediate body 66 therebetween. Its length is at least equal to the outside diameter of sleeve 52. The height of attenuator 54 is substantially equal to the given height of windows 58 and 60; however, the thickness of attenuator 54 is substantially less than the width of windows 58 and 60, thus allowing for a degree of movement therein along the direction of the longitudinal axis 24.

In a preferred embodiment, the attenuator 54 can have a thickness of about 0.004 inches and the windows 58 and 60 can have a width of about 0.016 inches.

The permissible lateral movement of attenuator 54 is important in automatically positioning the attenuator between its associated fibers in a close fitting relationship. Thus, while the precision ferrules 40 and 42 which carry the fibers 32 and 34 are made to close tolerances, it is possible to insert one fiber further into housing 12 than the center thereof. In such a case, if the attenuator 54 were restrained from movement, it could easily be damaged. This invention obviates this problem by allowing the lateral movement of the attenuator and insuring close contact of the fiber ends with the respective surfaces of the attenuator.

As noted above, the attenuator 54 is quite thin. In a preferred embodiment, attenuator 54 can comprise a carbon layer sandwiched between two sheets of Mylar. Such materials are available in varying degrees of attenuation from the Arizona Carbon Foil Company. Other types of attenuators can be employed, however.

Utilization of this invention obviates the disadvantages of the prior art devices. The attenuators can easily be accommodated to existing fiber optic connectors. For example, the housing 12 described herein is a standard fiber optic connector available from Kyocera Corporation, Kyoto, Japan. When mated with the in-line attenuator described herein, a simple solution to a complex problem is provided.

While there have been shown and described what are at present considered to be the preferred embodiments of the invention, it will be apparent to those skilled in the art that various changes and modifications can be made herein without departing from the scope of the invention as defined by the appended claims.

We claim:

1. An in-line optical attenuator for optical fibers comprising: a housing having a longitudinal axis and a longitudinal aperture aligned therewith including first and second ends for receiving first and second axially aligned optical fibers; an attenuator holder positioned in said longitudinal aperture, said holder being tubular and having a longitudinal slit running the entire length of said holder, and a pair of attenuator receiving windows formed in said holder, transverse to said longitudinal axis and oppositely disposed from one another, said windows having a given height and a given width; and an optical attenuator having first and seconds ends disposed in said holder, said first end of said attenuator engaging one of said windows and said second end of said attenuator engaging the other of said windows, the body of said attenuator intermediate said ends being disposed across said longitudinal axis, said attenuator having a height substantialy equal to said given height and a thickness substantialy less than said given width.

2. The in-line optical attenuator of claim 1 wherein said attenuator is substantially rectangular.

* * * * *